United States Patent [19]

Ryan et al.

[11] 4,131,064
[45] Dec. 26, 1978

[54] TAGGING PARTICLES WHICH ARE EASILY DETECTED BY LUMINESCENT RESPONSE, OR MAGNETIC PICKUP, OR BOTH

[75] Inventors: Frederick M. Ryan, Loyalhanna Township, Westmoreland County; Paul C. Handke, Plum Borough, both of Pa.

[73] Assignee: Westinghouse Electric Corp., Pittsburgh, Pa.

[21] Appl. No.: 816,221

[22] Filed: Jul. 15, 1977

[51] Int. Cl.² .............................................. F42B 1/00
[52] U.S. Cl. ...................................... 102/1 R; 149/2; 149/18; 149/21; 252/408; 102/22 R
[58] Field of Search ............... 149/2, 18, 21; 252/408; 102/1 R, 22

[56] References Cited
U.S. PATENT DOCUMENTS

| | | | |
|---|---|---|---|
| Re. 29,334 | 8/1977 | Ryan et al. | 149/18 |
| 3,772,200 | 11/1973 | Livesay | 252/301.1 R |
| 3,897,284 | 7/1975 | Livesay | 149/2 |
| 3,967,990 | 7/1976 | Ryan et al. | 149/2 |
| 3,993,838 | 11/1976 | Heytmeijer et al. | 149/21 |
| 4,053,433 | 10/1977 | Lee | 149/18 |

*Primary Examiner*—Edward A. Miller
*Attorney, Agent, or Firm*—W. D. Palmer

[57] ABSTRACT

Small particles for tagging of objects to be identified comprise luminescent material plus other material which provides information indicia for tagging purposes. Included in the tagging particles are very small particles of magnetic material which is reflective both for the radiations which excite the luminescent material and also for the radiations generated by the excited luminescent material. The inclusion of the reflective magnetic particles introduces only a minimal decrease in the effectiveness of the luminescent material to provide a spotting or locating function. The particles may thus be located either by their luminescent response, or by magnetic pickup, or both. Inorganic species of these particles are especially useful for tagging explosives for post-explosion indentification of the explosives.

13 Claims, 5 Drawing Figures

TAGGING PARTICLES WHICH ARE EASILY DETECTED BY LUMINESCENT RESPONSE, OR MAGNETIC PICKUP, OR BOTH

BACKGROUND OF THE INVENTION

This invention relates to tagging of objects to be identified and, more particularly, to tagging particles which are easily detected by luminescent response, or magnetic pickup, or both.

In U.S. Pat. No. 3,772,099, dated Nov. 13, 1973, to Frederick M. Ryan, one of the present co-inventors, and Robert C. Miller, is described a fluorescent tagging means for pre-detonation or post-detonation identification of explosives. This is accomplished by a combination comprising spotting phosphor which is excitable by ultraviolet radiations to provide a band-type emission and coding phosphors which emit a line-type emission. All of the phosphors have very small particle sizes and are incorporated into phosphor grains held together by an inorganic cement or a binder and the resulting conglomerate grains are dispersed in the explosive. After an explosion, the phosphor grains can be readily located by the ultraviolet response of the spotting phosphor, and information disclosed by the presence (or absence) of the coding phosphor can then be decoded. The spotting phosphor will also normally provide some additional indicia of information. Further refinements of this tagging system are disclosed in U.S. Pat. No. 3,967,990 dated July 6, 1976 issued to Ryan et al.

To inhibit any tendency for the phosphor conglomerate particles to sensitize the explosives, the individual particles can be encapsulated in an organic plastic material such as polyethylene and a method for so encapsulating these particles is disclosed in U.S. Pat. No. 3,961,106 dated June 1, 1976 to Heytmeijer et al. These encapsulated particles can incorporate an anti-static coating, such as amorphous carbon, in order to prevent electrostatic charging thereof and such a coating is described in U.S. Pat. No. 3,993,838 dated Nov. 23, 1976 to Heytmeijer et al.

U.S. Pat. No. 3,897,284 dated July 29, 1975 to Livesay discloses microparticles for tagging of explosives, which particles incorporate a substantial proportion of magnetite which enables the particles to be located by means of magnetic pickup. Ferrite has also been used. More recently, the assignee of the foregoing Livesay patent has developed modified tagging particles which comprise strips of color coding material having a layer of magnetite affixed to one side thereof and layers of fluorescent material affixed to both exterior sides thereof, so that location of the taggant can be accomplished by visual detection of the luminescent response, or magnetic pickup, or by both. Both the ferrite and the magnetite materials are dark colored, however, and absorptive of both the radiations which excite the luminescent material and the resulting luminescence emitted therefrom, thereby making the particles somewhat more difficult to locate after an explosion.

SUMMARY OF THE INVENTION

There are provided small individual particles for tagging of objects desired to be indentified. Each of the particles comprises luminescent material means which will provide readily detectable luminescent response upon exposure to excitation radiations of predetermined wavelength shorter than the luminescent response of the luminescent material. Associated therewith are other material means which will provide predetermined indicia of information regarding the tagged object once the other material means is located. Included with the luminescent material and other identifying material are small particles of magnetic material means which is reflective both for the excitation radiations for the luminescent material and the readily detectable luminescent response of the luminescent material. The foregoing are held together in small particle form by a bonding means or binding material means and the bonding material is transmissive both for the excitation radiations for the luminescent material and for the luminescent response thereof. The resulting particles are readily recoverable by the resulting efficient visual luminescent response of the luminescent material, or by magnetic pickup, or by both visual detection and magnetic pickup, and there is very little absorption of radiations due to the inclusion of the magnetic material in the particles.

The luminescent material used in these particles can be either organic or inorganic depending upon the application therefor. If it is desired to tag explosives, the luminescent material is finely divided and inorganic, as described in the aforementioned U.S. Pat. No. 3,772,099 and in such case, the luminescent material is normally selected to be responsive to ultraviolet excitation in order to produce the readily detectable visual response. In the case of either organic luminescent material or inorganic luminescent material, the use of the reflective magnetic material introduces substantially no absorption of any of these radiations so that the efficiency of visual detection is not appreciably impaired.

BRIEF DESCRIPTION OF THE DRAWINGS

For a better understanding of the invention, reference may be had to the preferred embodiments, exemplary of the invention, shown in the accompanying drawings, in which.

DESCRIPTION OF THE PREFERRED EMBODIMENTS

Figure 1:
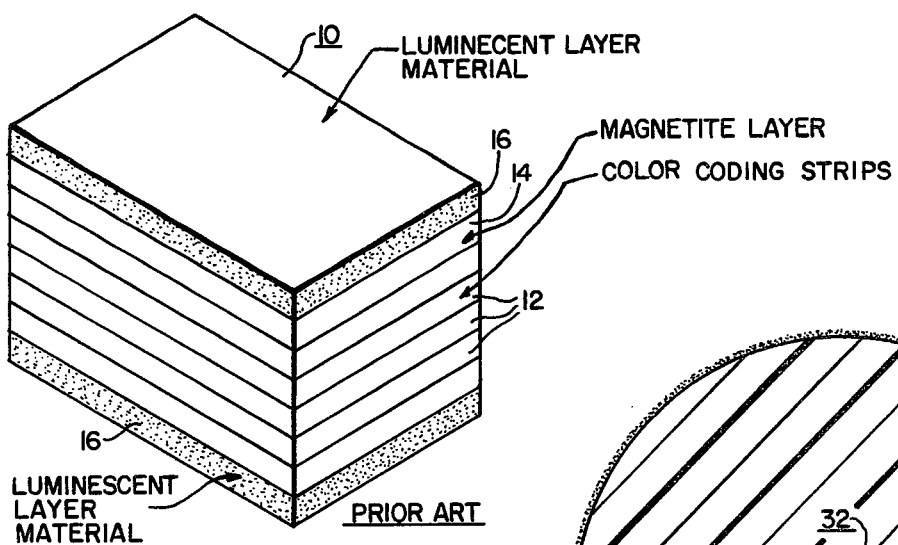
FIG. 1 is an isometric view of a pertinent prior art taggant wherein a magnetic ferrite or magnetite layer is carried next to one surface thereof and luminescent material layers are carried on opposite exterior surfaces thereof.

In FIG. 1 there is shown a taggant 10 of the prior art wherein a plurality of different colors of plastic strips 12 overlie one another and are affixed together as a unitary body by a suitable binder. Next to one face of the taggant is included a magnetite layer 14 and on both exterior faces of the taggant are included layers of luminescent material 16. As a specific example, the taggant has a polyhedron configuration with dimensions of 0.5 mm × 0.5 mm × 0.15 mm. The dark colored magnetite layer 14 is absorptive of both the excitation radiations for the luminescent material and the resulting luminescence therefrom so that essentially only one face of each of the luminescent layers is effective in generating spotting or locating radiations. For this reason, the efficiency of detection using the luminescent response of the taggant 10 is not as good as desired.

Figure 2:
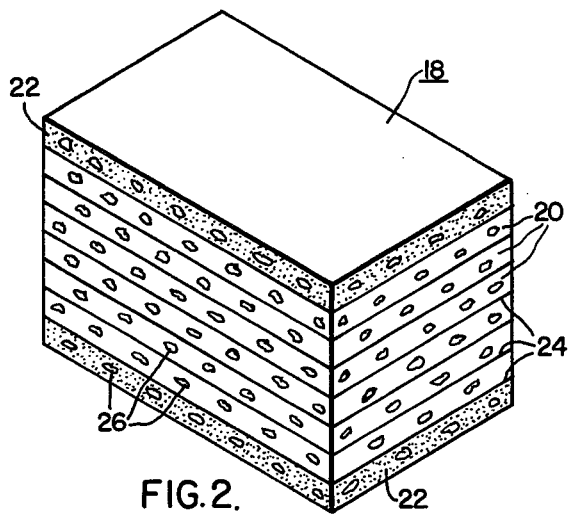
FIG. 2 is a taggant constructed in accordance with the present invention wherein organic or inorganic luminescent material layers are carried on two surfaces thereof and very small particles of reflective magnetic material are dispersed within the taggant.

In FIG. 2 there is shown a tagging particle 18 constructed in accordance with the present invention wherein the color coding strips 20 are superimposed over one another and affixed together by a suitable binder, as in the case of the taggant 10 shown in FIG. 1. As a specific example, the individual color coding strips can be respectively formed of red, white, green, blue, yellow, and orange material, the colors of which can readily be detected under a microscope, once the taggant particle is located. The order of the colors will indicate certain information, as in the prior art taggant 10 as shown in FIG. 1, and the use of color coding as an indicia of information does not form any part of the present invention.

In accordance with the present invention, layers of organic or inorganic luminescent material 22 are carried on opposite sides of the composite particle 18 in order to facilitate the detection thereof by luminescent response. Scattered throughout the body of the composite particle 18 are a plurality of very small particles 26 of magnetic material which is reflective both for the excitation radiations and the visible response thereof from the luminescent layers 22. In this manner, the luminescent response of the composite particle 18 is enhanced since the magnetic particles introduce substantially no absorption of the excitation radiations or luminescent response of the layers 22.

As a specific example, the particle 18 is formed as a polyhedron. In case the luminescent layers 22 are organic, they can be formed of plastic having embedded therein a fluorescent organic pigment containing an activator. Typically, the pigments will be fluorescent dyes, such as rhodamine B, which emits in the red, or naphthalamine, which emits in the green. Rhodamine B is excited by ultraviolet radiations as well as visible radiations having a wavelength shorter than about 590 nm and naphthalamine is excited by shortwave visible and radiations shorter than about 380 nm. These materials can be embedded in acrylate plastics with the organic pigment added in an amount of a few percent, such as from 1% to 10% by weight of the acrylate. In case the luminescent layers 22 are formed of inorganic phosphors, any of the so-called spotting phosphors disclosed in the aforementioned U.S. Pat. No. 3,722,099 can be used, an example being a manganese-activated zinc silicate. The binder material 24 which affixes the individual plastic layers 20 and the luminescent layers 22 is also selected to be transmissive for the excitation radiations and the luminescent response of the layers 22. Suitable binder materials are polyvinyl alcohol, polyethylene oxide, cyanoacrylate, or nitrocellulose. As a specific example, the composite taggant 18 can have a height dimension of 25 microns to 100 microns with the lateral dimensions being somewhat irregular and varying from 100 microns to 200 microns. The plastic colored layers 20 typically comprise 70% by weight of the total particle with 10% to 20% by weight of magnetic material and 10% by weight of luminescent plastic layers 22. The binder material typically comprises about 1% by weight of the total taggant particle 18.

As an alternative embodiment, the individual plastic colored layers 20 and the luminescent material layers 22 can be bonded together by a heat-sealing process, thereby eliminating additional binding material to cement the layers together. In the case a heat sealing process is used, the bonding material or means which holds the particles together thus comprises the heat sealed organic material of the individual layers, which is transmissive for the radiations of interest.

The finely divided magnetic material particles 26 which are reflective as specified can be formed of various different materials such as No. 410 stainless steel, nickel powders, electropolished iron, copper-plated iron, and stainless steel powder. For some of the larger size taggant particles, stainless steel globules having a smooth surface are commercially available. For an embodiment such as shown in FIG. 2, the magnetic material particles are normally selected to have a very fine state of division and stainless steel powder having an ultimate particle size of 1 to 5 microns is suitable.

Summarizing the particle as shown in FIG. 2, it comprises a luminescent material means which provides readily detectable luminescent response upon exposure to excitation radiations having a predetermined wavelength shorter than the luminescent response of the luminescent material. The particle also includes other material which will provide predetermined indicia of information once the other material is located and for this embodiment, different colors of plastic strips are utilized. Scattered throughout the particle 18 are very small particles 26 of magnetic material which is reflective both for the excitation radiations for the luminescent material and for the readily detectable luminescent response therefrom. The bonding means or binder material which holds together the particle constituents is also transmissive both for the excitation radiations for the luminescent material and for the readily detectable luminescent response. In this manner, some of the excitation radiations can penetrate from the side portions of the particles to excite the luminescent layers and the luminescent response therefrom will also be detectable from the sides as well as the top and bottom faces thereof. Thus the luminescent detection is enhanced. If the magnetic material was a dark ferrite or magnetite, it would absorb both the excitation radiations and the detectable luminescent response, thereby impairing the detectability of the particles.

Figure 3:
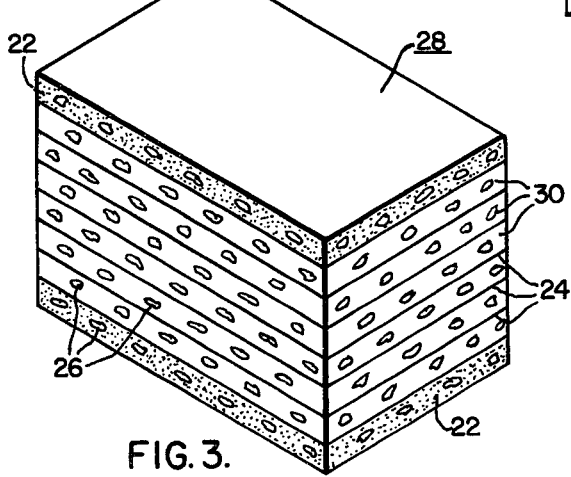
FIG. 3 illustrates an alternative embodiment of the taggant as shown in FIG. 2 wherein the coding information is supplied by layers of plastic containing individual elements which can be identified by a variety of different techniques once they are located.

The embodiment as shown in FIG. 3 corresponds to that shown in FIG. 2, except that the particle 28 incorporates individual layers 30 which are coded by composition rather than color. For example, plastic layers can incorporate small amounts of different impurity constituents, such as white salts, with the detection practiced as described in Livesay U.S. Pat. No. 3,897,284. The fluorescent detection and magnetic detection is the same as in the previous embodiment shown in FIG. 2. Of course, any of the particle embodiments shown in FIGS. 1 through 3 can be encapsulated in an enclosing polyethylene casing or sheath, if desired.

Figure 4:
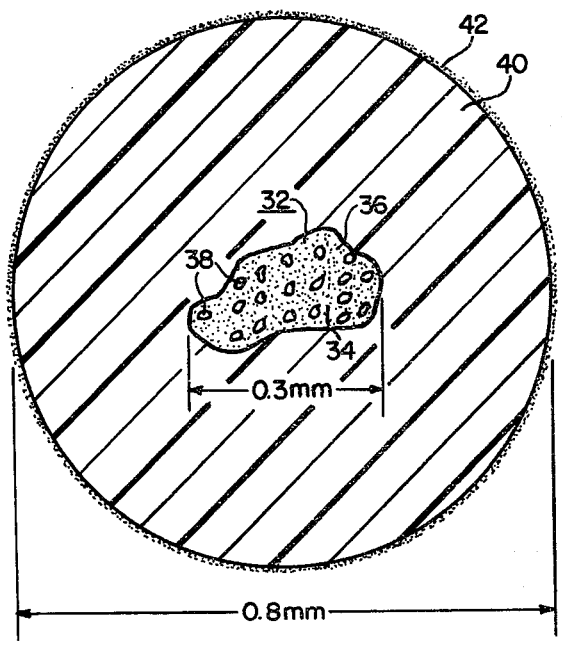
FIG. 4 is an enlarged sectional view of an inorganic conglomerate taggant incorporating reflective magnetic material and which is encased in a layer of soft plastic covered with an anti-static coating.

The embodiment as shown in FIG. 4 is particularly adapted for tagging explosive materials and the particle 32 is generally formed as disclosed in the aforementioned U.S. Pat. No. 3,772,099. The particle thus comprises the individual very small phosphor particles 34 which are retained in conglomerate form by a suitable binder material 36 such as potassium silicate. In accordance with the present invention, however, the particle is modified to incorporate small bits or globules 38 of reflective magnetic material such as stainless steel. In this manner, the particles can be recovered by magnetic pickup as well as by visual detection. As a practical matter, in the case of tagging explosives, the particles are normally located visually using ultraviolet excitation and once the luminescence of the spotting phosphor has been detected, a magnet is used to facilitate the actual pickup of particle, thus facilitating recovery. In accordance with the teachings set forth in U.S. Pat. No. 3,961,106, the particles 32 are covered with a coating 40 of polyethylene to decrease the sensitivity of the dynamite. Over the applied polyethylene coating is placed a thin layer of amorphous carbon 42 to act as an antistatic coating. As a specific example, the spotting phosphor is zinc silicate and is present in amount of 45% by weight of the composite particle. The coding phosphor is present in amount of 5% by weight of the particle along with finely divided alumina filler material present in amount of 10% by weight. The binder is potassium silicate present in amount of 30% by weight and the reflective magnetic material is stainless steel present in amount of 10% by weight, with the individual composite particle weight being about $6 \times 10^{-5}$ gm. The weight of polyethylene casing 40 which surrounds each particle composite is typically about six times the weight of the inorganic particle. A 200 gram stick of dynamite can be tagged with about 340 individual plastic-encased tagging particles.

Summarizing the particles as disclosed in FIG. 4, they essentially comprise a luminescent material means 34 which will provide a readily detectible luminescent response upon exposure to excitation radiations, such as ultraviolet radiations, having predetermined wavelength shorter than the luminescent response of the luminescent material particles. Other material such as so-called line-emitting phosphors provide additional predetermined indicia of information once the particle has been located. There is also included in the conglomerate particle 32 relatively small particles of magnetic material 38 which is reflective both for the excitation radiation for the luminescent material and for the readily detectable luminescent response of the excited luminescent material. A binder material 36, which is preferably inorganic such as potassium silicate, holds together in small particle form the spotting luminescent material along with the other line-emitting luminescent material which provides the detailed tagging or coding information, as well as the reflective magnetic material, and the binder material is transmissive both for the excitation radiations for the luminescent material and for the readily detectable luminescent response of the spotter luminescent material. As a result, the particles are recoverable by visual detection, or by magnetic pickup, or by both visual detection and magnetic pickup, with substantially no absorption of radiations due to the inclusion of the magnetic material in the particles.

Figure 5:
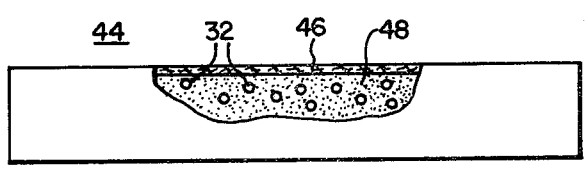
FIG. 5 is an elevational view, shown partly in section, of an explosive cartridge which incorporates identifying taggants as shown in FIG. 4.

In FIG. 5 is shown an explosive cartridge 44, such as a dynamite cartridge, partly in section, showing the conventional casing 46 which encloses the explosive material 48 having scattered therein the individual particles 32 as shown in FIG. 4. If desired, the particles could be included as a part of the casing 46 or even on the exterior surface thereof, although it is preferred to embed the particles within the actual explosive material 48. The particles all contain identifying information regarding the explosive charge involved, examples being the type of explosive, place of manufacture, and date of manufacture which, when correlated against the distribution records, would normally provide information regarding the last legal owner of the explosive. As a specific example, the encased particles 32 are dispersed in the dynamite cartridge in amount of about 0.06% by weight of the dynamite.

We claim:
1. Small individual particles for tagging of objects desired to be identified, said particles each comprising:
    (a) luminescent material means which will provide readily detectable luminescent response upon exposure to excitation radiations of predetermined wavelength shorter than the luminescent response of said luminescent material means;
    (b) other material means which will provide predetermined indicia of information once such other material means is located;
    (c) small particles of magnetic material means which is reflective both for said excitation radiations for said luminescent material means and for said readily detectable luminescent response of said luminescent material means; and
    (d) bonding means bonding together in small particle form said luminescent material means, said other material means and said reflective magnetic material means, and said bonding means transmissive both for said excitation radiations for said luminescent material means and for said readily detectable luminescent response of said luminescent material means; whereby said particles are recoverable by visual detection or by magnetic pickup or by both visual detection and magnetic pickup with substantially no absorption of radiations due to the inclusion of said magnetic material means in said particles.
2. The particles as specified in claim 1, wherein said luminescent material means comprises organic luminescent material.
3. The particles as specified in claim 1, wherein said luminescent material means comprises inorganic luminescent material.
4. Small individual conglomerates for tagging of objects desired to be identified, said conglomerates each comprising:
    (a) finely divided inorganic luminescent material means which will provide readily detectable luminescent response upon excitation by ultraviolet radiations;
    (b) finely divided other material means which will provide predetermined indicia of information once such other material means is located;
    (c) small particles of magnetic material means which is reflective both for visible radiations and ultraviolet radiations; and
    (d) inorganic binder material means binding together in small conglomerate form said inorganic luminescent material means, said other material means and said reflective magnetic material means, and said binder material means transmissive for ultraviolet radiations and also for the luminescent response of said ultraviolet-excited luminescent material means; whereby said conglomerates are recoverable by visual detection or by magnetic pickup or by both visual detection and magnetic pickup with substantially no absorption of radiations due to the inclusion of said magnetic material means in said conglomerates.

5. The conglomerates as specified in claim 4, wherein said reflective magnetic material is formed of one of magnetic stainless steel, nickel powder, electropolished iron, or copper-plated iron.

6. In combination, an explosive device and associated tagging means which is readily recoverable either before or after said explosive device is detonated and which, after recovery, provides information about said explosive device, said tagging means comprising small individual conglomerates intimately associated with said explosive device and each comprising:
   (a) finely divided inorganic luminescent material means which will provide readily detectable luminescent response upon excitation by ultraviolet radiations;
   (b) finely divided other material means which will provide predetermined indicia of information about said explosive device once such other material means is located;
   (c) small particles of magnetic material means which is reflective both for visible radiations and ultraviolet radiations; and
   (d) binder material means binding together in small conglomerate form said inorganic luminescent material means, said other material means and said reflective magnetic material means, and said binder material means transmissive for ultraviolet radiations and also for the luminescent response of said ultraviolet-excited luminescent material means; whereby said conglomerates are recoverable by visual detection or by magnetic pickup or by both visual detection and magnetic pickup with substantially no absorption of radiations due to the inclusion of said magnetic material means in said conglomerates.

7. The combination as specified in claim 6, wherein each of said small conglomerates includes a plastic casing surrounding same to offset any tendency of said conglomerates to sensitize said explosive material.

8. The particles for tagging of objects as specified in claim 1, wherein said particles of magnetic material means are magnetic stainless steel particles.

9. The particles for tagging of objects as specified in claim 8, wherein said magnetic stainless steel particles have a particle size of 1 to 5 microns.

10. The conglomerates as specified in claim 5, wherein said reflective magnetic material is formed of particles of magnetic stainless steel.

11. The conglomerates as specified in claim 10, wherein said particles of magnetic stainless steel have a particle size of 1 to 5 microns.

12. The combination as specified in claim 7, wherein said small particles of reflective magnetic material means are particles of magnetic stainless steel.

13. The combination as specified in claim 12, wherein said particles of magnetic stainless steel have a particle size of 1 to 5 microns.

* * * * *